United States Patent
Gonze et al.

(10) Patent No.: US 8,615,988 B2
(45) Date of Patent: Dec. 31, 2013

(54) ELECTRICAL DIESEL PARTICULATE FILTER (DPF) REGENERATION

(75) Inventors: Eugene V. Gonze, Pinckney, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 831 days.

(21) Appl. No.: 11/209,427

(22) Filed: Aug. 23, 2005

(65) Prior Publication Data
US 2007/0044460 A1   Mar. 1, 2007

(51) Int. Cl.
*F01N 3/00* (2006.01)

(52) U.S. Cl.
USPC ............ 60/295; 60/274; 60/286; 60/297; 60/300; 60/311

(58) Field of Classification Search
USPC ............ 60/274, 276, 295, 297, 300, 311
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 4,928,485 A | 5/1990 | Whittenberger | |
| 5,457,945 A * | 10/1995 | Adiletta | 55/301 |
| 5,458,673 A * | 10/1995 | Kojima et al. | 95/11 |
| 5,711,149 A * | 1/1998 | Araki | 60/278 |
| 5,746,989 A * | 5/1998 | Murachi et al. | 423/213.7 |
| 5,782,941 A * | 7/1998 | Matsunuma et al. | 55/282 |
| 5,853,459 A * | 12/1998 | Kuwamoto et al. | 95/273 |
| 5,863,311 A * | 1/1999 | Nagai et al. | 55/483 |
| 5,974,791 A * | 11/1999 | Hirota et al. | 60/276 |
| 6,233,927 B1 * | 5/2001 | Hirota et al. | 60/297 |
| 6,235,254 B1 * | 5/2001 | Murphy et al. | 423/212 |
| 2005/0120712 A1 * | 6/2005 | Tsutsumoto et al. | 60/297 |

FOREIGN PATENT DOCUMENTS

| | | |
|---|---|---|
| CN | 1470748 A | 1/2004 |
| DE | 3403564 A1 | 8/1984 |
| EP | 1426592 A2 | 6/2004 |
| JP | 11-081985 * | 3/1999 |
| JP | 2001-173429 A | 6/2001 |
| JP | 2003-027922 * | 1/2003 |

OTHER PUBLICATIONS

German Office Action for Serial No. 102006038922.0 dated Jan. 12, 2011; 3 Pages.

* cited by examiner

*Primary Examiner* — Thomas Denion
*Assistant Examiner* — Diem Tran

(57) ABSTRACT

An exhaust system that processes exhaust generated by an engine includes a diesel particulate filter (DPF) that is disposed downstream of the engine and that filters particulates from the exhaust. An electrical heater is disposed upstream of the DPF and selectively heats the exhaust to initiate combustion of the particulates within the exhaust as it passes therethrough. Heat generated by combustion of the particulates induces combustion of particulates within the DPF.

4 Claims, 4 Drawing Sheets

ELECTRICAL DIESEL PARTICULATE FILTER (DPF) REGENERATION

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD OF THE INVENTION

The present invention relates to diesel engines, and more particularly to diesel particulate filter (DPF) regeneration.

BACKGROUND OF THE INVENTION

Diesel engines have higher efficiency than gasoline engines due to the increased compression ratio of the diesel combustion process and the higher energy density of diesel fuel. As a result, a diesel engine provides improved gas mileage than an equivalently sized gasoline engine.

The diesel combustion cycle produces particulates that are typically filtered from the exhaust gases. A diesel particulate filter (DPF) is usually disposed along the exhaust stream to filter the diesel particulates from the exhaust. Over time, however, the DPF becomes full and must be regenerated to remove the trapped diesel particulates. During regeneration, the diesel particulates are burned within the DPF to enable the DPF to continue its filtering function.

A traditional regeneration method injects fuel into the exhaust stream after the main combustion event. The post-combustion injected fuel is combusted over catalysts placed in the exhaust stream. The heat released during the fuel combustion on the catalysts increases the exhaust temperature, which burns the trapped soot particles in the DPF. This approach, however, can result in higher temperature excursions than desired, which can be detrimental to exhaust system components including the DPF.

SUMMARY OF THE INVENTION

Accordingly, the present invention provides an exhaust system that processes exhaust generated by an engine. The exhaust system includes a diesel particulate filter (DPF) that is disposed downstream of the engine and that filters particulates from the exhaust. An electrical heater is disposed upstream of the DPF and selectively heats the exhaust to initiate combustion of the particulates within the exhaust as it passes therethrough. Heat generated by combustion of the particulates induces combustion of particulates within the DPF.

In one feature, the electrical heater is offset a distance from the DPF.

In another feature, the electrical heater is a resistive heater.

In still other features, the exhaust system further includes a control module that selectively enables current flow to the electrical heater. The control module determines an estimated amount of particulate matter within the DPF and initiates DPF regeneration when the amount exceeds a threshold amount. The control module enables the current flow for an initial period of a DPF regeneration cycle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
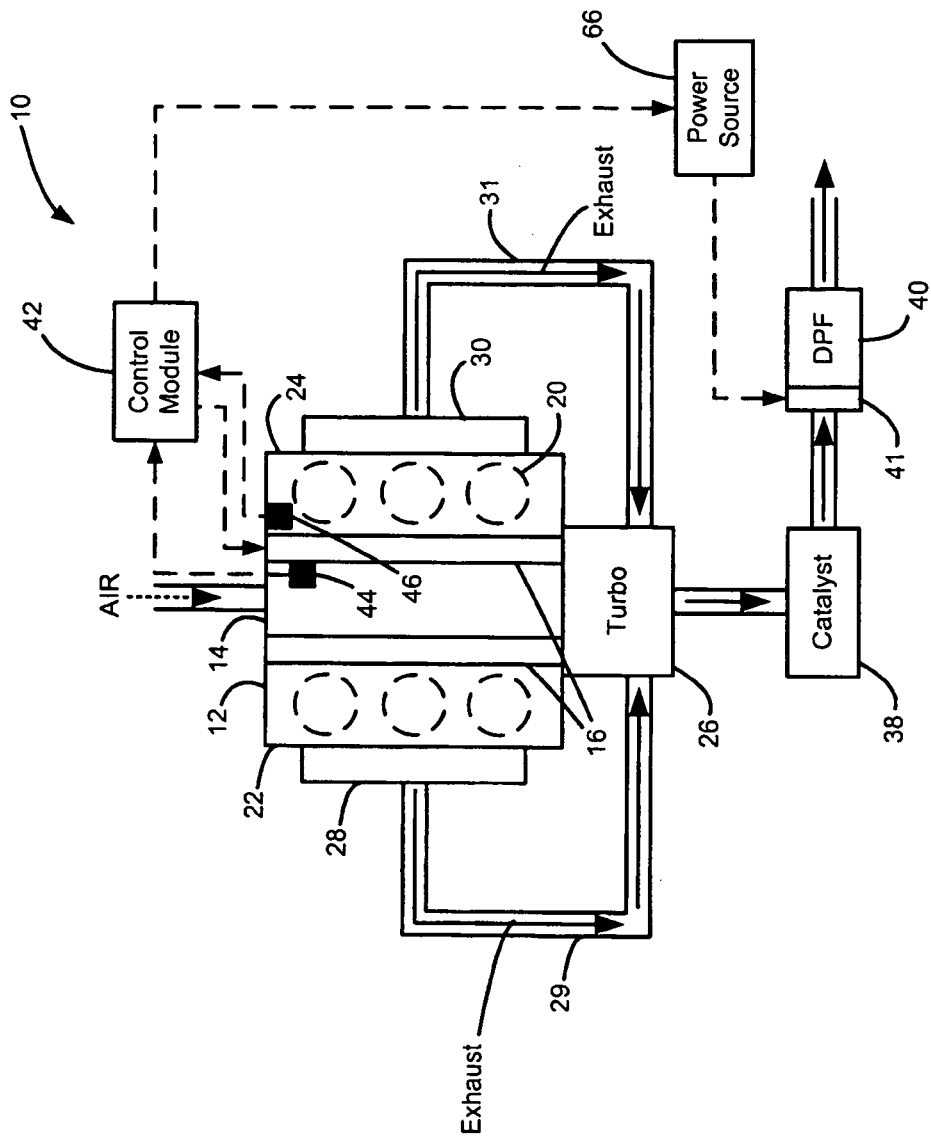
FIG. 1 is a schematic view of an exemplary diesel engine system that includes a diesel particular filter (DPF) regeneration system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1 an exemplary diesel engine system 10 is schematically illustrated in accordance with the present invention. It is appreciated that the diesel engine system 10 is merely exemplary in nature and that the diesel particulate filter (DPF) regeneration system described herein can be implemented in various diesel engine systems implementing a DPF. The diesel engine system 10 includes a diesel engine 12, an intake manifold 14, a common rail fuel injection system 16 and an exhaust system 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the DPF regeneration control of the present invention can be implemented in an inline-type cylinder configuration, as discussed in further detail below.

Air is drawn into the intake manifold 14 through a throttle (not shown). Air is drawn into the cylinders 20 from the intake manifold 14 and is compressed therein. Fuel is injected into cylinder 20 by the common rail injection system 16 and the heat of the compressed air ignites the air/fuel mixture. The exhaust gases are exhausted from the cylinders 20 and into the exhaust system 18. In some instances, the diesel engine system 10 can include a turbo 26 that pumps additional air into the cylinders 20 for combustion with the fuel and air drawn in from the intake manifold 14.

The exhaust system 18 includes exhaust manifolds 28,30, exhaust conduits 29,31, a catalyst 38, a diesel particulate filter (DPF) 40 and a heater 41. First and second exhaust segments are defined by the first and second cylinder banks 22,24. The exhaust manifolds 28,30 direct the exhaust segments from the corresponding cylinder banks 22,24 into the exhaust conduits 29,31. The exhaust is directed into the turbo 26 to drive the turbo 26. A combined exhaust stream flows from the turbo 26 through the catalyst 38 and the heater 41 to the DPF 40. The DPF 40 filters particulates from the combined exhaust stream as it flows to the atmosphere. The heater 41 selectively heats the exhaust stream flowing therethrough to regenerate the DPF 40, as explained in further detail below.

A control module 42 regulates operation of the diesel engine system 10 according to the DPF regeneration control of the present invention. More particularly, the control module 42 communicates with an intake manifold absolute pressure (MAP) sensor 44 and an engine speed sensor 46. The MAP sensor 44 generates a signal indicating the air pressure within the intake manifold 14 and the engine speed sensor 46 generates a signal indicating engine speed (RPM). The control module 42 determines an engine load based on the RPM and fueling rates. The fueling rate is generally measured in fuel volume per combustion event. Engine output is controlled via the fueling rate.

Figure 2:
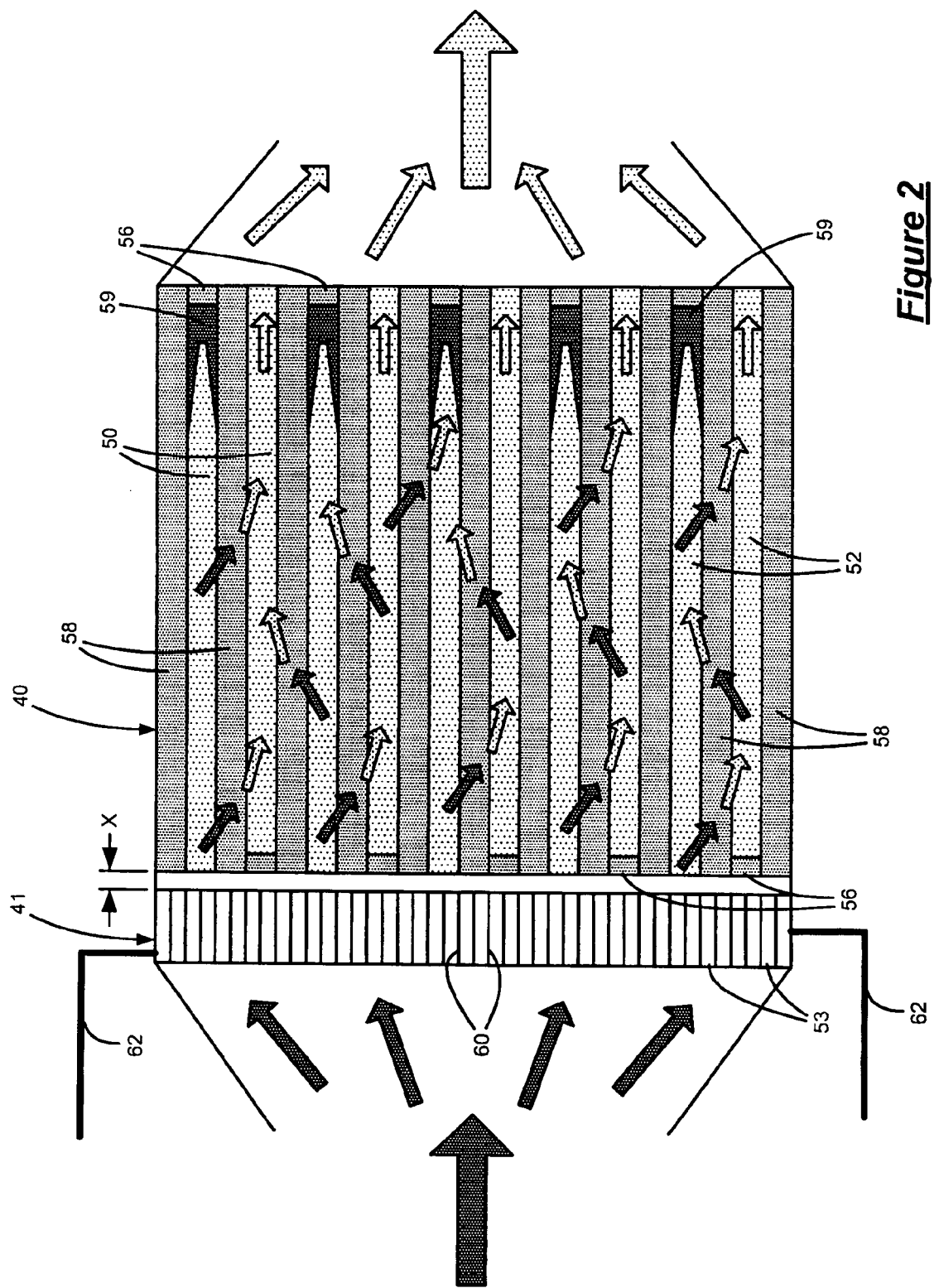
FIG. 2 is a schematic cross-section of a DPF including a heater according to the present invention.
Figure 3:
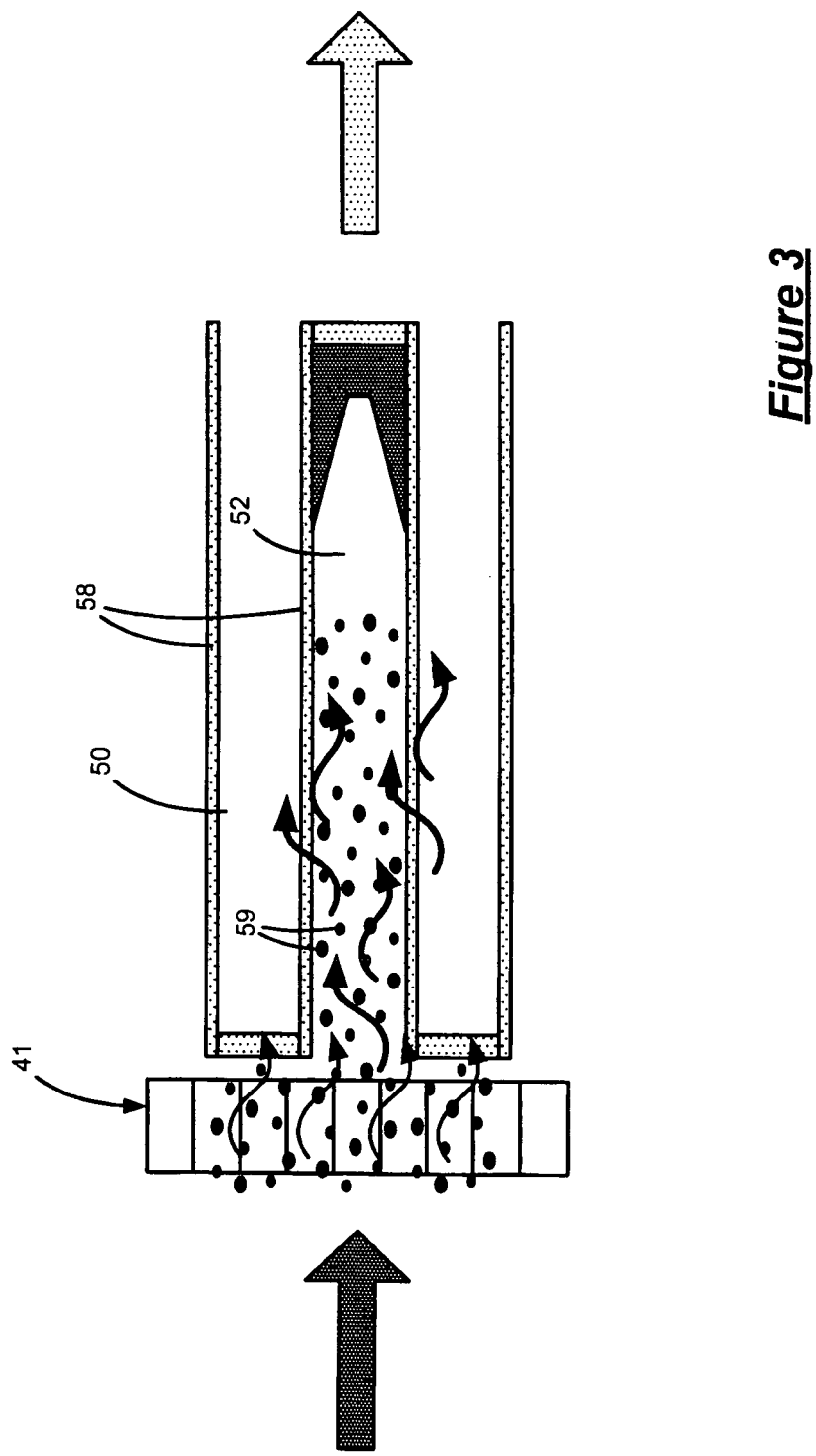
FIG. 3 is a schematic cross-section of a portion of the DPF of FIG. 2 operating in a regeneration mode.

With particular reference to FIGS. 2 and 3, the DPF 40 is monolith particulate trap and includes alternating closed cells/channels 50 and open cells/channels 52. Exhaust gases such as those generated by the engine 12 pass through channels 53 of the heater 41, enter the closed end channels 50 depositing particulate matter 54 and exit through the open channels 52. Plugs 56 are used to seal the ends of the channels 50,52. Walls 58 of the DPF 40 are preferably comprised of a porous ceramic honeycomb wall of chordierite material. It is appreciated that any ceramic comb material is considered within the scope of the present invention. Soot particles 59 flow into the DPF 40 and are trapped therein.

With further reference to FIG. 2, the heater 41 is offset a distance X from the DPF 40 and is upstream of the DPF 40. The heater 41 is preferably a resistive heater that includes a plurality of resistive elements 60 and electrical terminals 62. The electrical terminals 62 are connected to a power source 66 (see FIG. 1). When operating in a regeneration mode, electrical current selectively flows across the heater 41 inducing heating of the resistive elements 60. More specifically, when DPF regeneration is desired, an electric current is applied to the resistive elements 60 to generate heat.

With particular reference to FIG. 3, heat is transferred to the soot particles 59 flowing through the channels 53 during the DPF regeneration process. Sufficient heat is transferred to induce exothermic combustion of the soot particles 59, releasing additional heat. The heat flows into the DPF 40 heating the soot particles 59 therein. As a result, a cascading effect is achieved through the DPF 40, whereby heat generated through combustion of upstream soot particles 59 induces combustion of downstream soot particles 59. In other words, the heater 41 functions as an ignition catalyst that ignites or lights off the upstream soot particles 59, the combustion heat of which, in turn lights off the downstream soot particles 59. In this manner, all of the soot particles 59 within the DPF 40 are combusted to regenerate the DPF 40.

The DPF regeneration process is periodically initiated to regenerate the DPF 40. More specifically, the control module 42 estimates loading of the DPF. When the estimated loading achieves a threshold level (e.g., 5 grams/liter of particulate matter) and the exhaust flow rate is within a desired range, current is applied to the heater 41 to initiate the regeneration process. The duration of the regeneration process varies based upon the amount of particulate matter within the DPF 40. It is anticipated, that the regeneration process can last between 4-6 minutes. The electrical heater 41, however, is only implemented during an initial portion of the regeneration process. More specifically, the electric heater 41 heats the exhaust flowing therethrough for a threshold period (e.g., 1-2 minutes). The remainder of the regeneration process is achieved using the heat generated by combustion within the DPF 40.

Figure 4:
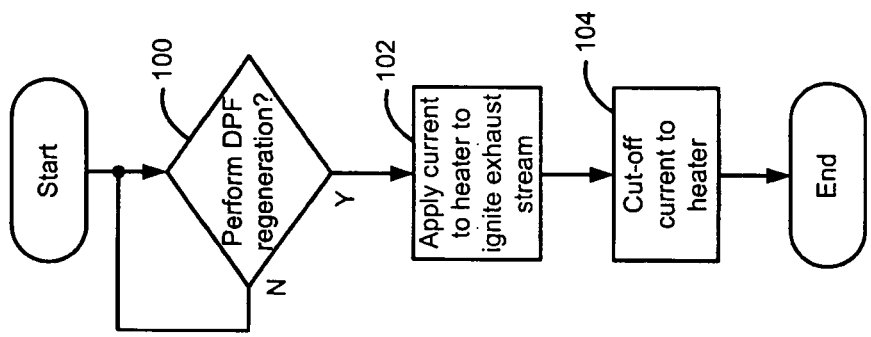
FIG. 4 is a flowchart illustrating the DPF regeneration control of the present invention.

Referring now to FIG. 4, a flowchart illustrates the DPF regeneration control of the present invention. In step 100, control determines whether DPF regeneration is to be performed. As described above, DPF regeneration is initiated when particulate amount within the DPF 40 exceeds a threshold amount and the exhaust flow rate exceeds a threshold flow rate. If control determines that DPF regeneration should not be performed, control loops back. If control determines that DPF regeneration should be performed, control provides current to the electrical heater 41 in step 102. As described in further detail above, the electrical heater 41 heats the exhaust flowing therethrough to initiate combustion of the exhaust. The heat generated by the combustion process further induces combustion of the soot particles within the DPF 40 to regenerate the DPF 40. In step 104, control cuts-off current to the heater after a threshold period has expired (e.g., 1-2 minutes) and control ends.

The DPF regeneration system of the present invention provides distinctive advantages over the prior art. More specifically, the DPF regeneration system inhibits extreme temperature excursions that could be detrimental to the exhaust system components. As compared to other electrical energy-based DPF regeneration systems, the DPF regeneration system of the present invention is more efficient (approximately 80-90% efficient).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system for a vehicle, the system comprising:
    a diesel particulate filter (DPF) that filters particulates in exhaust output from an engine of the vehicle;
    an electric heater disposed a first non-zero distance upstream of the DPF and a second non-zero distance downstream of an oxidation catalyst, wherein the electric heater includes a plurality of channels to heat the particulates in the exhaust flowing from the oxidation catalyst to the DPF; and
    a control module that:
        determines whether to initiate regeneration of the DPF, wherein the regeneration includes ignition of particulates stored in the DPF,
        initiates the regeneration of the DPF in response to a determination that an exhaust flow rate is within a predetermined range,
        activates the electric heater to initiate the regeneration in response to the determination, wherein when the electric heater is activated heat transfers from the electric heater to the particulates in the exhaust, and heat from the particulates in the exhaust causes particulates stored in the DPF to ignite for a first period, and
        de-activates the electric heater based on an expiration of a threshold period,
    wherein the first period is greater than the threshold period, and after the electric heater is deactivated, the regeneration continues for a remainder of the first period.

2. The system of claim 1 wherein the threshold period is between 1 and 2 minutes.

3. A method for a vehicle, the method comprising:
    filtering particulates from exhaust output from an engine of the vehicle using a diesel particulate filter (DPF);
    determining whether to initiate regeneration of the DPF;

initiating the regeneration of the DPF in response to a determination that an exhaust flow rate is within a predetermined range;

activating an electric heater in response to the determination to initiate the regeneration, wherein the electric heater generates heat when activated, the electric heater is disposed a first non-zero distance upstream of the DPF and a second non-zero distance downstream of an oxidation catalyst, the electric heater has a plurality of channels, and the regeneration lasts for a first period; and de-activating the electric heater based on an expiration of a threshold period that is less than the first period.

4. The method of claim 3 wherein the threshold period is between 1 and 2 minutes.

* * * * *